United States Patent [19]

Stevenson

[11] Patent Number: 5,429,011

[45] Date of Patent: Jul. 4, 1995

[54] HEADLAMP ADJUSTING SYSTEM FOR VEHICLES

[75] Inventor: Jordan M. Stevenson, Novi, Mich.

[73] Assignee: TRW Inc., Cleveland, Ohio

[21] Appl. No.: 140,670

[22] Filed: Oct. 21, 1993

[51] Int. Cl.⁶ .......................... F16H 25/24; B60Q 1/06
[52] U.S. Cl. .................. 74/89.13; 74/89.15; 74/606 R; 362/66
[58] Field of Search ............... 74/89.13, 89.15, 606 R; 362/66, 69

[56] References Cited

U.S. PATENT DOCUMENTS

| | | | |
|---|---|---|---|
| 4,665,469 | 5/1987 | Furfari et al. | 74/606 R X |
| 4,742,435 | 5/1988 | Van Duyn et al. | 362/66 |
| 4,774,639 | 9/1988 | Baur et al. | 362/66 |
| 4,939,945 | 7/1990 | Ryder et al. | 74/89.13 |
| 4,980,804 | 12/1990 | Dobler | 362/69 |
| 5,034,870 | 7/1991 | Weber | 362/428 |
| 5,060,127 | 10/1991 | Birt | 362/66 X |
| 5,214,971 | 6/1993 | Burton et al. | 74/89.13 |

Primary Examiner—Allan D. Herrmann
Attorney, Agent, or Firm—Daniel G. Blackhurst

[57] ABSTRACT

A headlight adjustment mechanism comprised of interactive plastic drive and adjustment bevel gears located within a two-piece plastic housing wherein a threaded adjustment rod passes through a threaded axial bore in the adjustment bevel gear. Cooperating flats on the adjustment rod and the drive gear prevent rotation of the adjustment rod during rotation of the adjustment gear.

16 Claims, 2 Drawing Sheets

HEADLAMP ADJUSTING SYSTEM FOR VEHICLES

BACKGROUND OF THE INVENTION

The subject invention is directed to the art of headlamp adjusting systems and, more particularly, to a headlamp adjusting system using bevel gears enclosed in a hinged, folding housing.

Mechanisms and systems for vertical and horizontal adjustment of seal beam type automobile headlamps have previously been provided. Generally, such systems provided for individual lamp adjustment via independent adjusting screws by driving such screws with a suitable tool. Occasionally, the adjusting screws were difficult to access or first required time consuming removal of certain components of the headlamp assembly. Sometimes problems were encountered because the adjusting screws had became corroded or otherwise rusted and/or coated with road grime, rendering the adjustment procedure inordinately time consuming and difficult, or necessitating removal and replacement of a number of parts.

Some mechanisms are known which employ a bevel gear arrangement to adjust a headlamp. U.S. Pat. No. 4,742,435, for example, discloses a bevel gear headlamp adjustment system. However, the bevel gear system is enclosed in an intricately molded, non-hinged housing which is complicated and difficult to assemble. Furthermore, the mechanism is partially constructed of metal and is therefore susceptible to corrosion. In addition, the rotation of the adjustment shaft is prevented via a non-rotatable ball-in-socket arrangement.

U.S. Pat. No. 4,939,945 discloses a bevel gear adjustment system including a housing of which one part is formed of plastic. However, this patent fails to teach an easily assembled hinged housing comprised fully of plastic. In addition, the assembly requires the typical step in the art of attaching the adjustment member to the headlamp to prevent rotation of the adjustment member coincidentally with rotation of the adjustment bevel gear.

Accordingly, there is a need for a completely plastic and long lived adjustment device. Furthermore, it is desirable to have a simplified adjustment device which is easily assembled and installed.

BRIEF STATEMENT OF THE INVENTION

The subject invention provides a headlamp adjustment mechanism which is simple to assemble and has a long lifespan.

In accordance with the invention, the adjustment mechanism comprises a gear arrangement including a first "drive" gear which drives a second "adjustment" gear. Both gears are formed of plastic. Means are provided for selective rotation of the drive gear. The means may comprise a slot or aperture to accommodate a suitable tool, for example, an allen wrench or a phillips head screwdriver. The adjustment gear includes a threaded axial bore. The threaded bore receives an elongated threaded adjustment rod for connecting with an adjustment point on a headlamp. Rotation of the adjustment gear produces axial movement of the rod and thus of the headlamp.

In the preferred embodiment, the drive and adjustment gears are meshing bevel gears. A plastic housing surrounds the gears and at least the part of the adjustment element which is engaged with the threaded bore.

The housing includes a first chamber which encompasses the drive bevel gear and a second chamber which encompasses the adjustment bevel gear. The housing is formed of two sections connected by releasable means to allow opening and closing of the housing and thus access to the chambers and the drive and adjustment gears. The first and second chambers meet in a common area wherein the drive gear meshingly engages the adjustment gear.

Preferably, the adjustment rod has a flat side and there is a surface interactive with the flat side of the adjustment rod to prevent rotation of the adjustment rod when the adjustment bevel gear is rotated. Accordingly, only axial movement of the adjustment rod through the adjustment gear bore is permitted. In the specific embodiment disclosed, the flat axial end of the drive gear abuts the flat side of the adjustment element and prevents rotation.

In accordance with a further aspect of the invention, the two housing sections are releasably joined in assembled relationship by a hinge and latch arrangement. The drive and adjustment gears are maintained in their properly engaged relationship by the formation of the first and second chambers upon closure of the housing.

As can be seen from the foregoing, a primary object of the invention is the provision of a simplified headlamp adjustment mechanism which uses a minimum number of components and can readily be formed from plastic or other corrosion-resistant materials.

A further object of the invention is the provision of an adjustment mechanism of the type described wherein the housing is a two-piece, molded plastic structure that carries and guides the gears in integral chambers.

Another object of the invention is the provision of a mechanism of the type described that is economical to manufacture and reliable.

BRIEF DESCRIPTION OF THE DRAWINGS

The above and other objects and advantages of the invention will become apparent from the following description when read in conjunction with the accompanying drawing wherein.

DETAILED DESCRIPTION OF THE PREFERRED EMBODIMENT

Figure 1:
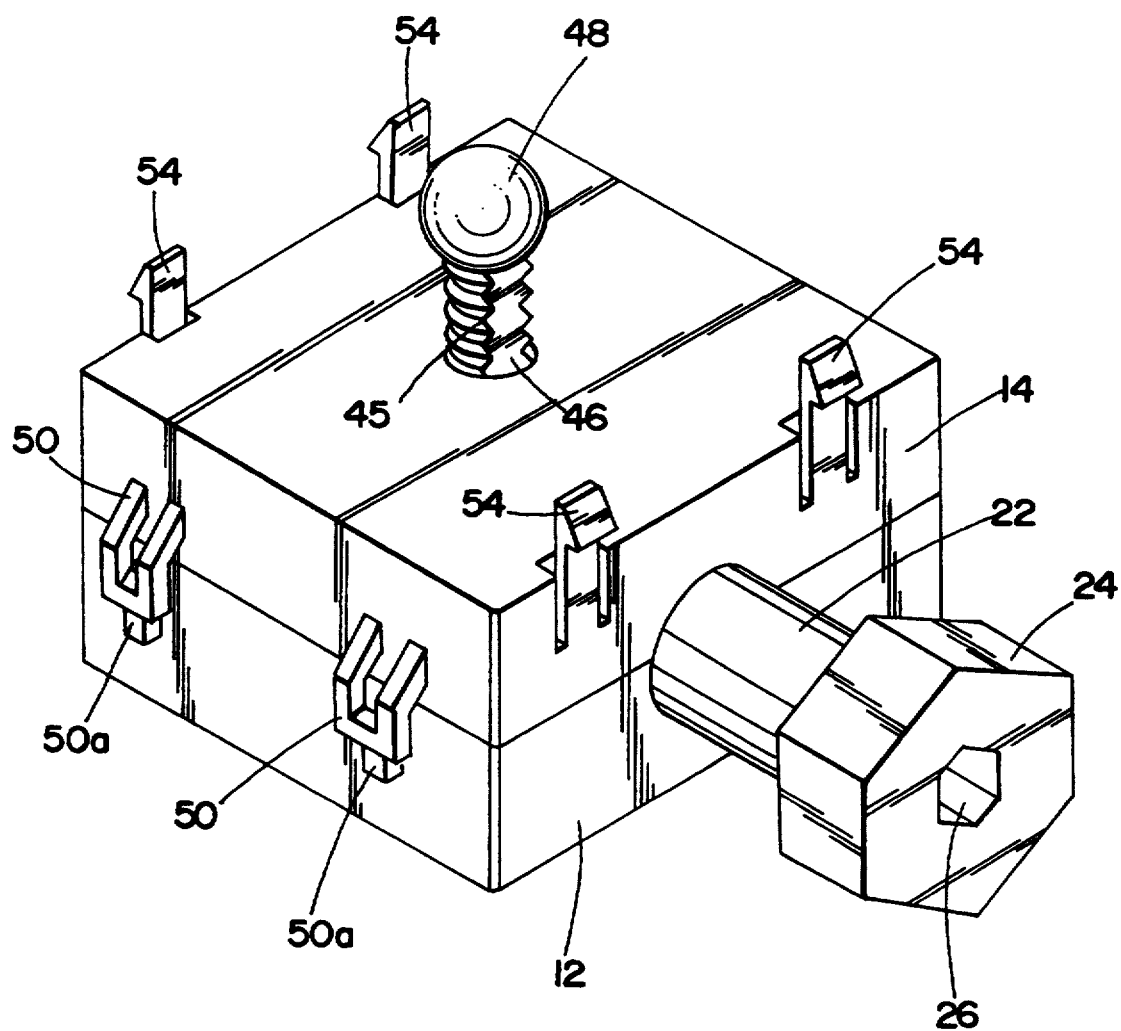
FIG. 1 is an isometric view showing the overall arrangement of the preferred embodiment of headlamp adjusting mechanism of the invention; and, FIG. 2 is an isometric view of the headlamp adjustment mechanism of FIG. 1 but showing the housing in its open position.
Figure 2:
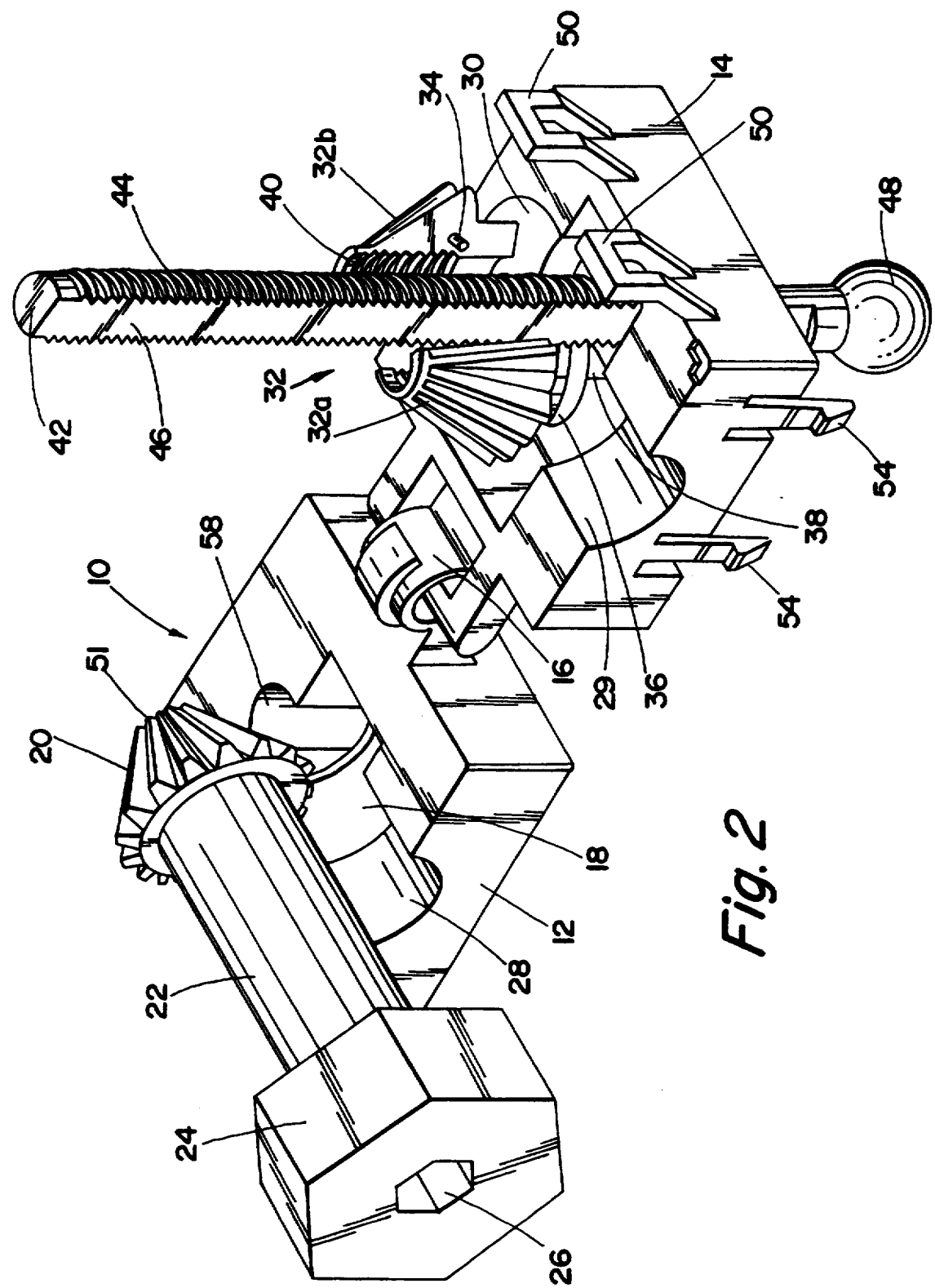

Referring more particularly to the drawing wherein the showing is for the purpose of illustrating a preferred embodiment of the invention only, and not for the purpose of limiting the same, FIGS. 1 and 2 show the overall arrangement of a preferred form of the headlamp adjustment assembly 10. As illustrated, the assembly 10 includes a rigid housing comprised of two molded plastic housing halves 12 and 14 joined by an integral molded hinge 16.

Housing half 12 includes an internal chamber 18 formed and sized to closely and rotatably receive and guide a drive bevel gear 20. Drive bevel gear 20 is shown in this embodiment as including an integral extension shaft element 22 terminating in a hex nut 24 which also includes an allen wrench recess 26. Nut 24 and recess 26 provide means for manually driving gear 20. It is, of course, possible that extension shaft element 22 could be eliminated and gear 22 simply incorporate a recess capable of directly accepting a suitable tool such as a screwdriver or allen wrench. In either embodiment, housing 12 is formed with a semi-cylindrical recess 28 in its side wall to accommodate extension shaft 22 or an inserted tool. In the closed position of assembly 10, recess 28 cooperates with semi-circular recess 29 in housing half 14 to form a cylindrical bearing which accommodates extension shaft 22.

Housing half 14 includes recess 30 shaped and sized to closely receive and guide a rotatable adjustment bevel gear 32. In its preferred form, bevel gear 32 is comprised of two identical half portions 32a and 32b. Portion 32b includes an alignment pin 34 which fits into a recess (not shown) in bevel gear portion 32a. Each half of adjustment gear 32 includes a shoulder element 36 which operatively fits within bearing recess 38 on housing half 14. Particularly, recess 38 is sized to closely encircle shoulder element 36 to keep bevel gear portions 32a and 32b functionally joined in their operative relationship and to provide a thrust surface and rotational bearing surface for the gear.

Adjustment bevel gear 32 is also equipped with a threaded axial through-bore 40. Bore 40 is arranged to threadedly engage and drivingly interact with an adjustment rod 42 and specifically with threads 44 on the exterior of rod 42. Housing half 12 includes a smooth bore 58 which allows guided passage of rod 42 axially therethrough when the assembly is in the closed position of FIG. 1. Housing half 14 includes a similar, axially aligned smooth bore. Preferably, rod 42 includes a flat side 46 which operatively engages with surface means to prevent rotation of rod 42 when adjustment bevel gear 32 is rotated. In the illustrated embodiment, the flat axial end 51 of bevel gear 20 engages the flat side 46 to prevent axial rotation of the rod 42. Also, the smooth bores in the two housing halves will preferably include flats for anti-rotation purposes.

Preferably, rod 42 includes at least one end terminating in a ball 48 which interacts with a socket joint (not shown) on an adjustable headlamp assembly. The interaction of the ball 48 and the manner of use for assembly 10 can be readily understood by reference to U.S. Pat. No. 4,742,435, issued May 3, 1988 for Support Arrangement for a Vehicle Headlamp.

When the two halves of the housing are mated, two cantilevered catches 50 on housing half 14 snap over resilient beveled latch tabs 50a on housing half 12 (see FIG. 1) to maintain the assembly 10 in its closed position. Many types of resilient latch or lock members, as well as other selectively releasable fasteners, could be used for this purpose.

Housing half 14 preferably includes a recess 56 which receives a complementary projection (not shown) on housing half 12 to achieve and maintain alignment of halves 12 and 14 in the closed position.

In its preferred embodiment, one half of housing 12 or 14 includes tabs 54 which interact with slots or openings (not shown) on a frame or superstructure of an automobile to attach headlamp adjustment apparatus 10 in its operative position.

The adjustment assembly of this invention is compatible with a variety of adjustable headlamp units known to those skilled in the art. As stated earlier, each of the identified parts in FIGS. 1 and 2 are preferably injection molded of plastic or similar moldable resinous material to resist the corrosive elements to which automobiles are often exposed. In addition, although the preferred embodiment is comprised wholly of plastic, several features of the invention are improvements in the art even when formed of traditional materials such as metals or alloys. As is apparent from the foregoing, the subject invention provides simple, easily manufactured and operated, and long-lived headlamp adjustment mechanism.

While the invention has been described with reference to a preferred embodiment, it is apparent that variations and modifications will occur to others upon a reading and understanding of the subject specification. It is intended to include such variations and modifications as part of our invention insofar as they come within the scope of the claims.

Having thus described the invention, it is now claimed:

1. A headlamp adjustment mechanism comprising:
   a housing formed of molded resinous material including releasably connected first and second sections cooperating to define first and second gear receiving chambers;
   a drive gear located in the first gear receiving chamber and closely received therein for guided rotatable motion;
   an adjustment gear located in the second gear receiving chamber and closely received therein for guided rotatable motion, the adjustment gear being in driven engagement with the drive gear;
   an axially extending threaded opening through the adjustment gear;
   an externally threaded adjustment rod extending through the threaded opening in the adjustment gear and drivingly engaged therewith, an end portion of the rod extending outwardly of the housing in guided relationship through an opening in at least one of the first and second sections; and,
   cooperating surfaces for preventing rotation of the adjustment rod while permitting axial translation in response to rotary movement of the adjustment gear.

2. The mechanism of claim 1 wherein said drive and adjustment gears are bevel gears.

3. The mechanism of claim 1 wherein at least one of said gears is comprised of two symmetric halves.

4. The mechanism of claim 3 further comprising an aperture in said housing surrounding a shoulder on said gear comprised of symmetric halves.

5. The mechanism of claim 1 further comprising manually operable means for rotating said drive gear.

6. The mechanism of claim 5 wherein said means for rotating comprises a cavity shaped to accommodate a tool.

7. The mechanism of claim 5 wherein said means for rotating comprises a member attached to said drive gear extending outside said housing.

8. The mechanism of claim 7 wherein said member terminates distally from said drive gear in a hex nut.

9. The mechanism of claim 1 wherein at least one end of said adjustment rod terminates in a generally spherical body.

10. The mechanism of claim 1 wherein said adjustment rod extends in guided relationship outwardly of the housing through openings formed in each of the first and second housing sections.

11. The mechanism of claim 1 further comprising at least one tab on said first housing member and at least one tab connector on said second housing member, said tab and said tab connector positioned to lockably engage when said housing is in a closed position.

12. The mechanism of claim 1, further comprising at least one resilient tab projecting outwardly from said housing for permitting attachment of said housing to a vehicle.

13. An improved headlight adjustment mechanism of the type in which gears transfer rotational force exerted on a drive gear to drive an adjustment gear creating generally linear motion of in an adjustment member coupled with said adjustment gear, the improvement wherein said mechanism includes a housing having first and second gear receiving chambers, cooperating surfaces on said drive gear and said adjustment member to prevent rotation of said adjustment member when said adjustment gear is rotated while permitting linear motion thereof.

14. The improved headlight adjustment mechanism of claim 13 wherein the housing and gears are formed of plastic material.

15. In an improved headlight adjustment mechanism of the type in which gears transfer rotational force exerted on a drive gear of said gears to drive an adjustment gear of said gears creating generally linear motion in an adjustment member coupled with said adjustment gear and a headlight, the improvement wherein the mechanism includes a housing having first and second gear receiving chambers and a surface on said adjustment member adjacent a cooperative surface on said drive gear to prevent rotation of said adjustment member when said adjustment gear is rotated.

16. The improved headlight adjustment mechanism of claim 15 wherein said housing and gears are formed of plastic material.

* * * * *